United States Patent
Kurt et al.

(10) Patent No.: US 12,539,386 B1
(45) Date of Patent: Feb. 3, 2026

(54) THERMOMAGNETIC INHALER AND METHOD OF USE

(71) Applicants: Emir Kurt, Toronto (CA); Victor Svetov, Toronto (CA); Andrey Gorlov, Toronto (CA); Ilya Somov, Toronto (CA)

(72) Inventors: Emir Kurt, Toronto (CA); Victor Svetov, Toronto (CA); Andrey Gorlov, Toronto (CA); Ilya Somov, Toronto (CA)

(*) Notice: Subject to any disclaimer, the term of this patent is extended or adjusted under 35 U.S.C. 154(b) by 0 days.

(21) Appl. No.: 19/247,536

(22) Filed: Jun. 24, 2025

(51) Int. Cl.
- *A61M 16/10* (2006.01)
- *A61M 16/12* (2006.01)
- A61M 16/00 (2006.01)

(52) U.S. Cl.
CPC ........ *A61M 16/12* (2013.01); *A61M 16/1005* (2014.02); *A61M 16/1085* (2014.02); *A61M 2016/0027* (2013.01); *A61M 2016/003* (2013.01); *A61M 2016/1025* (2013.01); *A61M 2202/0007* (2013.01); *A61M 2202/0028* (2013.01); *A61M 2202/0208* (2013.01); *A61M 2202/025* (2013.01); *A61M 2205/36* (2013.01)

(58) Field of Classification Search
CPC .............. A61M 16/12; A61M 16/1005; A61M 16/1085; A61M 2202/0208; A61M 2202/025
See application file for complete search history.

(56) References Cited

U.S. PATENT DOCUMENTS

| | | |
|---|---|---|
| 5,429,123 A | 7/1995 | Shaffer et al. |
| 6,983,749 B2 | 1/2006 | Kumar et al. |
| 9,833,643 B2 | 12/2017 | Squibb |
| 11,464,928 B2 | 10/2022 | White et al. |
| 11,918,735 B2 | 3/2024 | Olian, Jr. et al. |
| 2004/0107966 A1 | 6/2004 | Joachimsthaler et al. |
| 2008/0078389 A1 | 4/2008 | Xiao et al. |
| 2021/0008322 A1 | 1/2021 | Panin |

*Primary Examiner* — Margaret M Luarca
(74) *Attorney, Agent, or Firm* — Orin Del Vecchio

(57) ABSTRACT

Devices and methods for treating patients with respiratory distress syndrome, hypoxemia and hypercapnia. The device is a thermomagnetic inhaler includes two compressed gas sources, the first of which is a source of compressed helium, the second of oxygen, each of the compressed gas sources is sequentially connected by means of sealed tubes to filters, safety valves and adjustable valves, which are connected to a mixer, which is sequentially connected by means of sealed tubes to a heater, a magnetic element, a check valve and a face mask, wherein the magnetic element consists of a hollow magnetic circuit and permanent magnets, flow sensors are connected to sealed tubes between the adjustable valves and the mixer, oxygen and pressure sensors are connected to a sealed tube between the mixer and the heater, adjustable valves, flow sensors, oxygen sensor, pressure sensor and heater are connected to a control device.

11 Claims, 5 Drawing Sheets

THERMOMAGNETIC INHALER AND METHOD OF USE

FIELD OF THE INVENTION

The present invention relates generally to medical devices, more specifically but not by way of limitation, a breathing apparatus that is configured to be operably coupled to a first Oxygen (O2)source and Helium (He) source wherein the apparatus further includes a heater to provide warming of mixture of Oxygen and Helium passing through permanent magnets immediately prior to delivery to the patient.

BACKGROUND

Breathing assistance through gas mixtures has been a focal point of medical and sports science research. A gas mixture of helium and oxygen (Heliox) has demonstrated significant therapeutic benefits in both sports training and pulmonary illness treatment. Research suggest that this technology could further optimize respiratory efficiency and enhance recovery rates. Respiratory function plays a crucial role in athletic performance and the management of pulmonary diseases. Various gas mixtures, particularly helium-oxygen (Heliox), have been employed to enhance lung function and reduce airway resistance. Recent advances in thermomagnetic heating technology present an opportunity to refine the delivery of Heliox by optimizing gas temperature. This essay discusses the efficacy of Heliox in sports training and pulmonary treatment and evaluates the potential benefits of heating the gas mixture through a thermomagnetic heater.

Helium, a low-density gas, reduces airway resistance when combined with oxygen, facilitating more efficient breathing. Athletes training at high intensities often experience respiratory fatigue, which limits performance and endurance. Heliox inhalation can reduce the work of breathing, enabling athletes to train for longer durations with reduced respiratory strain. Studies have shown that Heliox improves oxygen delivery to muscle tissues, enhances endurance, and accelerates recovery following intense physical exertion. Additionally, by mitigating the effects of airway constriction, Heliox supports high-performance training without excessive physiological stress. For individuals with pulmonary conditions such as chronic obstructive pulmonary disease (COPD), asthma, and bronchitis, Heliox therapy is a well-established treatment that eases breathing difficulties. Due to its lower density compared to ambient air, Heliox decreases turbulent airflow in constricted airways, making it easier for patients to inhale and exhale. This results in decreased dyspnea (shortness of breath) and improved oxygenation. Furthermore, Heliox has been employed in critical care settings for ventilatory support, particularly for patients experiencing respiratory distress or requiring mechanical ventilation.

One of the limitations of gas therapy is the potential for discomfort due to temperature variations in inhaled air. Cold gases may irritate airways, exacerbating respiratory conditions or decreasing the efficiency of pulmonary function. A thermomagnetic heater could mitigate these effects by delivering Heliox at an optimal temperature, reducing airway constriction and enhancing gas exchange efficiency. Heated Heliox would be particularly beneficial for: Pulmonary Patients, warmer gases may prevent bronchospasms, a common reaction in asthma and COPD patients to cold air. By maintaining airway relaxation, heated Heliox could improve the efficacy of treatment. Athletes, warmer air increases alveolar gas exchange efficiency, potentially enhancing oxygen uptake and carbon dioxide elimination. This would contribute to better stamina, faster recovery, and improved respiratory muscle function during intense training. Critical Care, in medical ventilatory applications, precise temperature control can improve patient comfort and reduce complications associated with cold air inhalation, such as increased mucus production or airway constriction.

The therapeutic application of a helium-oxygen gas mixture offers significant advantages in both sports training and pulmonary illness management. By reducing airway resistance and enhancing oxygenation, Heliox has become a valuable tool in optimizing respiratory function. The integration of thermomagnetic heating in Heliox delivery systems presents an innovative enhancement, offering improved comfort, efficiency, and overall therapeutic outcomes. Data has shown that the clinical and athletic implications of temperature-controlled Heliox to further refine respiratory therapies and athletic performance optimization strategies could provide benefits.

Accordingly, there is a need for a breathing apparatus that makes it possible to quickly change the composition of the mixture of Oxygen (O2) and Helium (He) through heating of the mixture and magnetic element made of permanent magnets.

SUMMARY OF THE INVENTION

It is the object of the present invention to provide a mixed gas breathing apparatus that is configured to promptly change the composition of the Oxygen (O2) and Helium (He) gas mixture by heating to a temperature of 40-100° C. (104-212° F.) and magnetically polarising the gas molecules before delivery to the patient.

Another object of the present invention is to provide a breathing apparatus that is configured to provide a breathable gas mixture of helium and oxygen to a user wherein the controller of the present invention includes electronics and a user interface that provide an ability to control the gas mixture output.

A further object of the present invention is to provide a mixed gas breathing apparatus that is configured to provide mixing of two gases for delivery to a patient wherein the controller of the present invention is operably coupled to a first compressed gas source and a second compressed gas source.

Yet a further object of the present invention is to provide a breathing apparatus that is configured to provide a breathable gas mixture of helium and oxygen to a user wherein the present invention includes flow sensors configured to detect flow rates.

Still another object of the present invention is to provide a mixed gas breathing apparatus that is configured to provide mixing of two gases for delivery to a patient wherein the output of mixed gas passes through a heater cell.

An additional object of the present invention is to provide a breathing apparatus that is configured to provide a breathable gas mixture of helium and oxygen to a user wherein the heater cell is operably coupled to the electronics of the controller.

Yet a further object of the present invention is to provide a mixed gas breathing apparatus which includes a heater of a mixture of gases which, after heating, passes through a magnetic element consisting of permanent magnets, polarizes the Oxygen (O2) molecules and then delivers them to the patient.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

FIG. 3-1 is a diagrammatic view of an implementation option for the magnetic element of a thermomagnetic inhaler with an axial magnetic field.

FIG. 3-2 is a diagrammatic view of an alternate implementation option for the magnetic element of a thermomagnetic inhaler with a transverse magnetic field.

FIG. 3-3 is a diagrammatic view of an alternate implementation option for the magnetic element of a thermomagnetic inhaler with periodic magnetic field

DETAILED DESCRIPTION

Figure 1:
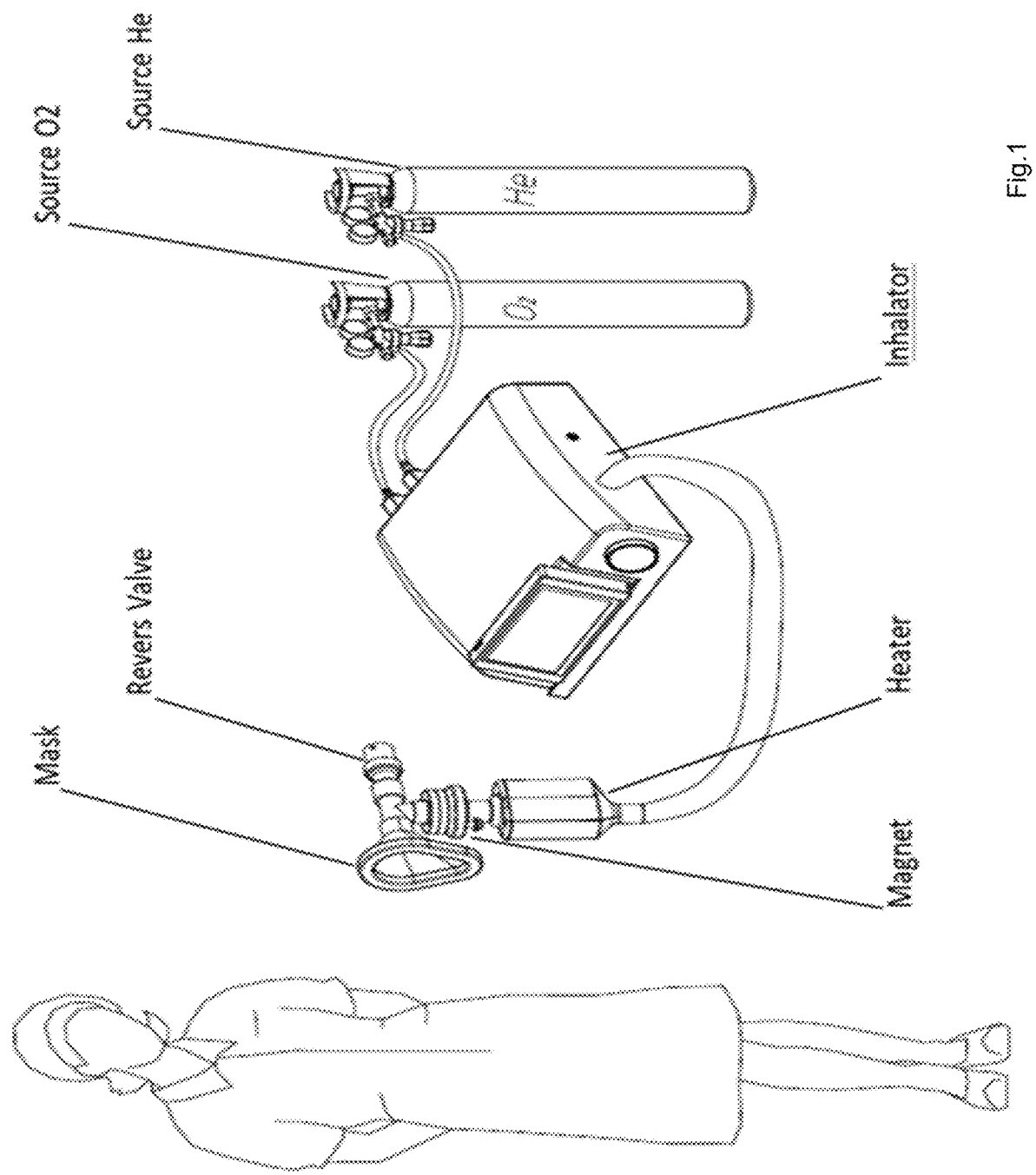
FIG. 1 is a schematic diagram of the operable layout thermomagnetic inhaler.

Referring now to the drawings submitted herewith, wherein various elements depicted therein are not necessarily drawn to scale and wherein through the views and figures like elements are referenced with identical reference numerals, there is illustrated a thermomagnetic inhaler 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the thermomagnetic inhaler 100 includes a controller 10 wherein the controller 10 has a housing 11 manufactured from a durable material such as but not limited to metal or plastic. The housing 11 forms an interior volume wherein disposed in the interior volume are electronics that are configured to receive, store, transmit and manipulate data. The electronics are conventional microprocessors that are programmed to execute the algorithms and operation of the thermomagnetic inhaler 100 to deliver a mixed breathing gas to a patient. The controller 10 includes a graphical interface 12 which provides display of the operational parameters of the thermomagnetic inhaler 100. The graphical interface 12 in a preferred embodiment is a LCD screen but it is contemplated within the scope of the present invention that the graphical interface 12 could be alternate types of displays. The controller 10 includes inlet ports 14, 16 that are operably coupled to the first gas source 2 and second gas source 4. Flow controllers 20,22 are present proximate the inlet ports 14,16 and are configured to provide measurement and flow regulation of the gas flow entering into the inlet ports 14, 16. It should be further understood within the scope of the present invention that the thermomagnetic inhaler 100 could have flow controllers operably disposed at various locations in the breathing circuit to provide measurement and control of the gas flow. Flow controllers 20,22 are operably coupled to the electronics in the controller 10 wherein the electronics provide operation thereof.

It should be understood within the scope of the present invention that the term breathing circuit refers to the gas flow from the first gas source 2 and second gas source 4 to the patient 99. The breathing circuit has present therein a temperature sensor 30. Temperature sensor 30 is operably coupled to the electronics in the controller 10 providing temperature measurement of the gas mixture at the outlet 42 of the heater cell 40. It is desired within the scope of the present invention that the gas mixture can be regulated to a temperature of up to two hundred and twelve degrees Fahrenheit (100° C.) for delivery to the patient. Temperature data transmitted from the temperature sensor 30 is utilized by the controller 10 for operable control of the heater cell 40 to control the temperature of the gas flow exiting the outlet opening 42. It is contemplated within the scope of the present invention that the breathing circuit could have temperature sensors in alternate locations therein. The breathing circuit further has disposed therein pressure sensors 35. Pressure sensors 35 are operably coupled to the electronics within the controller 10 and provide pressure measurement of the gas mixture at various locations within the breathing circuit. Transmitted data from the pressure sensors 35 is utilized to provide control thereof with the controller 10. It should be understood within the scope of the present invention that the thermomagnetic inhaler 100 could have pressure sensors 35 disposed in various locations in the breathing circuit.

Figure 5:
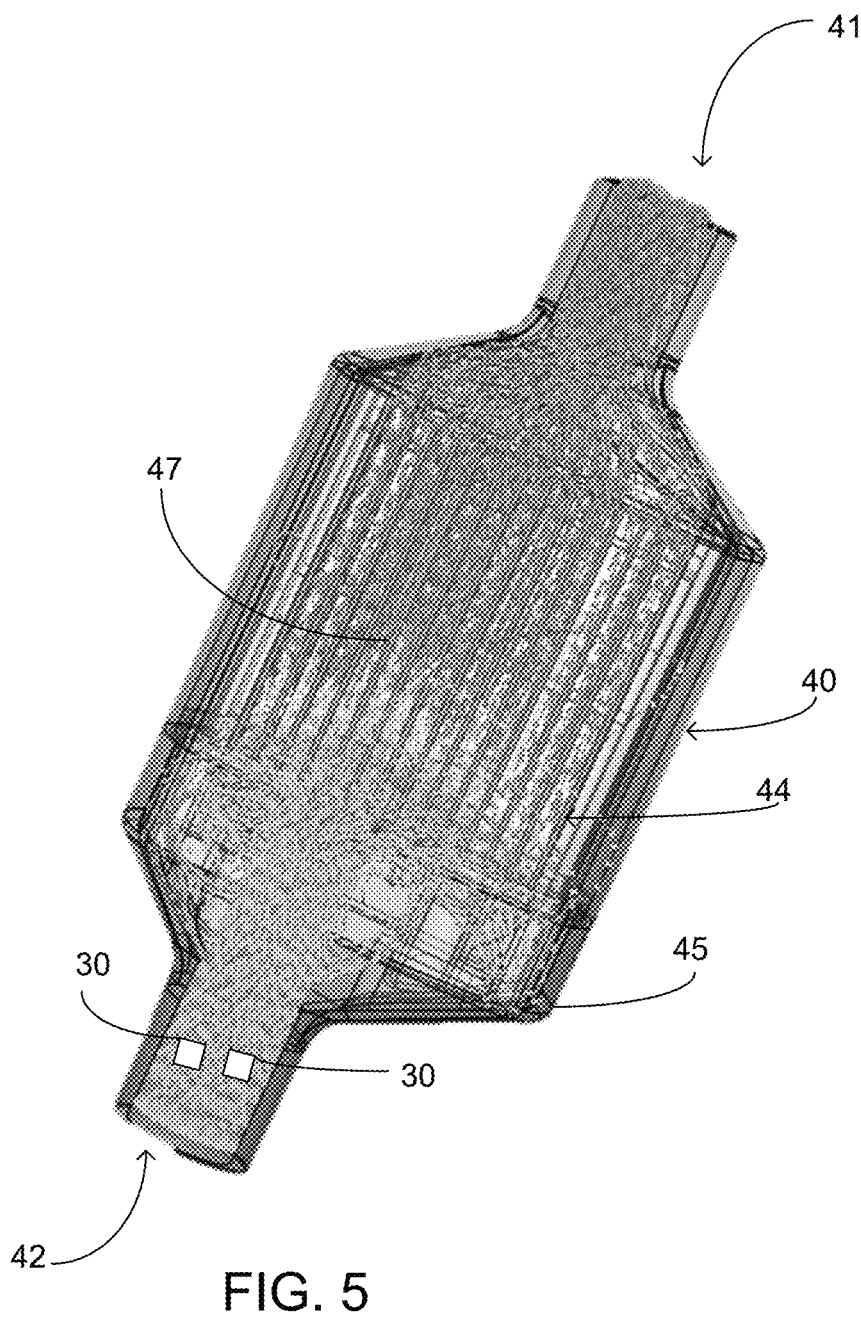
FIG. 5 is a diagrammatic view of a heater cell of the present invention.
Figure 6:
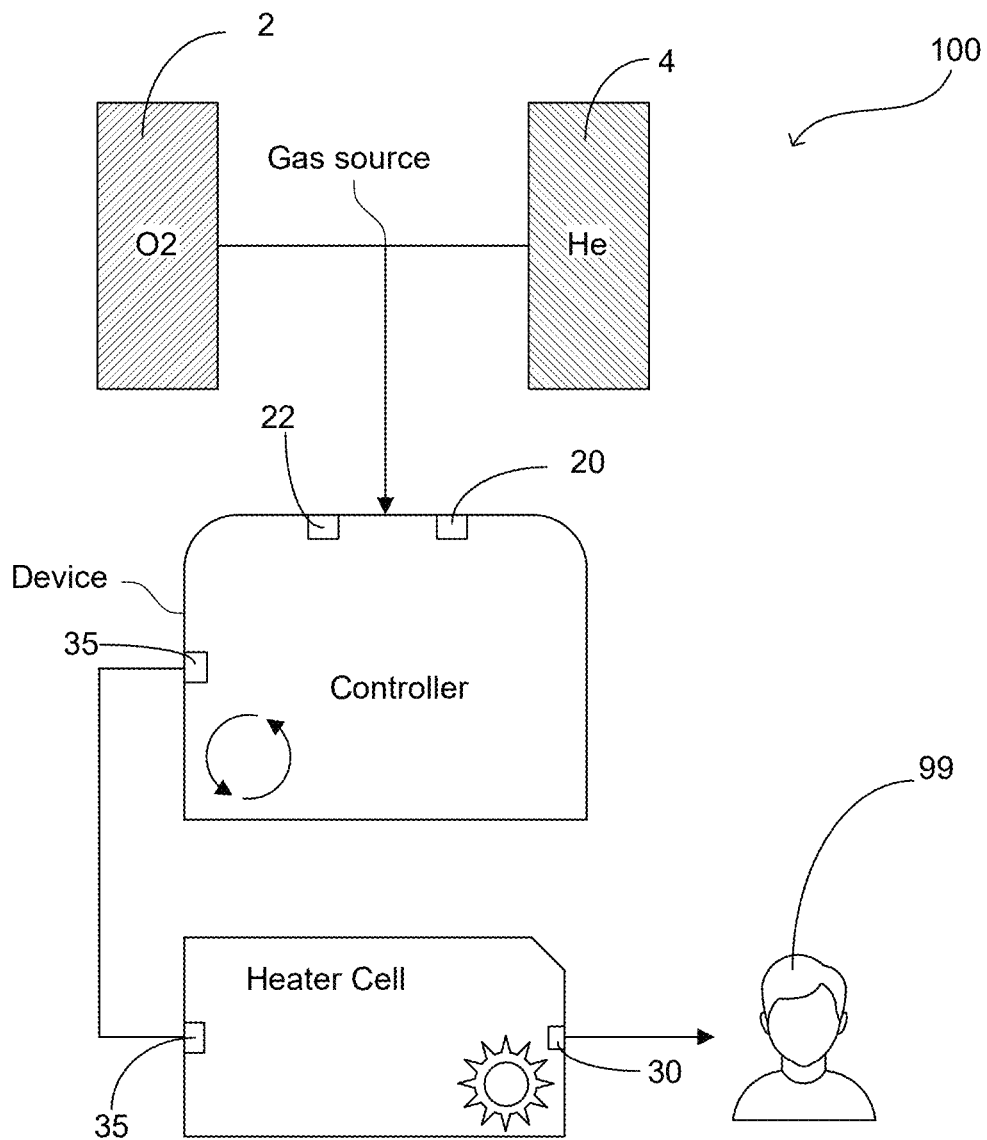
FIG. 6 is a schematic diagram of flow path of the present invention.

The thermomagnetic inhaler 100 further includes a heater cell 40 (FIG. 5). The heater cell 40 includes an exterior wall 45 forming an interior volume 44. An inlet opening 41 is located at one end of the heater cell 40 permitting gas to flow into the interior volume 40. FIG. 1 schematically shows a thermomagnetic inhaler. Oxygen (O2) and Helium (He) are supplied from cylinders to the inhaler. The gases are mixed to a specific composition between 20-50% oxygen (O2), then enter a heating element with temperatures up to 212 degrees Fahrenheit (100° C.), then the heated mixture of gases enters a magnetic element made of strong permanent magnets. The 02 molecules are polarized and flow through a filter to the patient. The mixture can be heated up to a temperature of eighty-five degrees. Heating of the gas mixture inhaled by the patient results in an increase in the oxygen consumption of the tissues. While not particularly illustrated herein, it should be understood that the breathing circuit includes conventional gas filters providing filtration of any potential contaminants from the first gas source 2 and second gas source 4. It should be further understood that various alternate types of hermetic tubing could be employed to facilitate operable connections between the first gas source 2, second gas source 4, controller 10, heater cell 40 and a mask for the patient. It should also be understood within the scope of the present invention that the heater cell 40 could be disposed within the interior volume of the controller 10 or located externally thereof.

The present invention result is achieved due to the fact that the thermomagnetic inhaler includes two compressed gas sources, the first of which is a source of compressed helium, the second compressed gas source is oxygen, each of the compressed gas sources is sequentially communicated by means of sealed tubes with filters, safety valves and adjustable valves, which are connected to a mixer, which is sequentially communicated by means of sealed tubes with a heater, a magnetic element, a check valve and a face mask, wherein the magnetic element consists of a hollow magnetic circuit and permanent magnets, flow sensors are connected to sealed tubes between the adjustable valves and the mixer, oxygen and pressure sensors are connected to a sealed tube between the mixer and the heater, adjustable valves, flow sensors, oxygen sensor, pressure sensor and heater are connected to a control device. The specified technical result is achieved due to the fact that the method of using a thermomagnetic inhaler is characterized by the fact that initially oxygen and helium are supplied from compressed gas sources, subsequently the compressed gas sources are filtered and mixed in mixers, successively the resulting gas mixture is heated and supplied to the hollow magnetic circuit of the magnetic element. The permanent magnets which polarize the oxygen molecules, and subsequently the gas mixture is supplied to the patient's respiratory tract through a check valve and a face mask.

Figure 2:
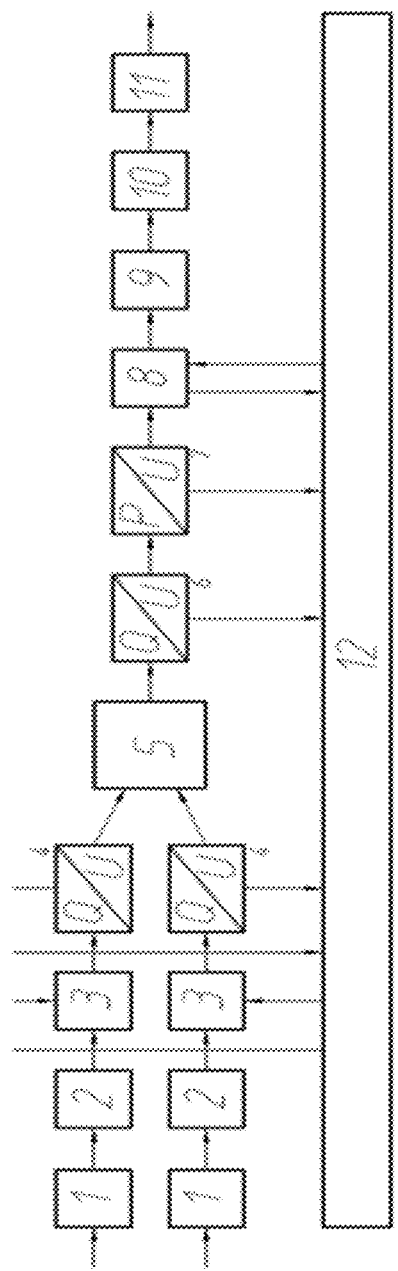
FIG. 2 is a functional diagram of the thermomagnetic inhaler.
Figures 1, 3:
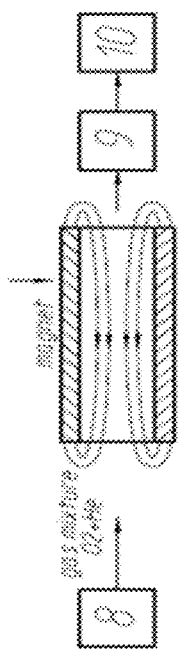
Figures 2, 3:
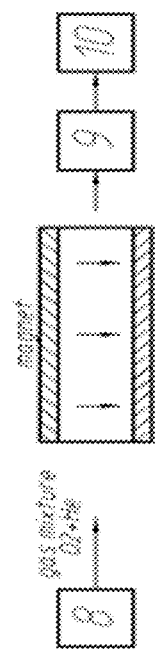
Figure 3:
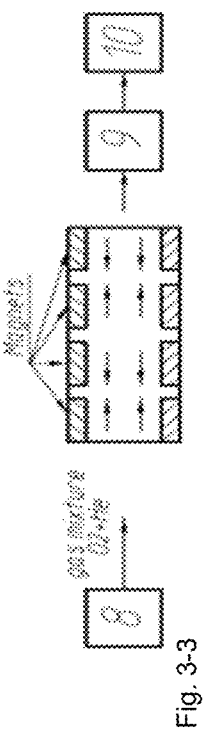
Figure 4:
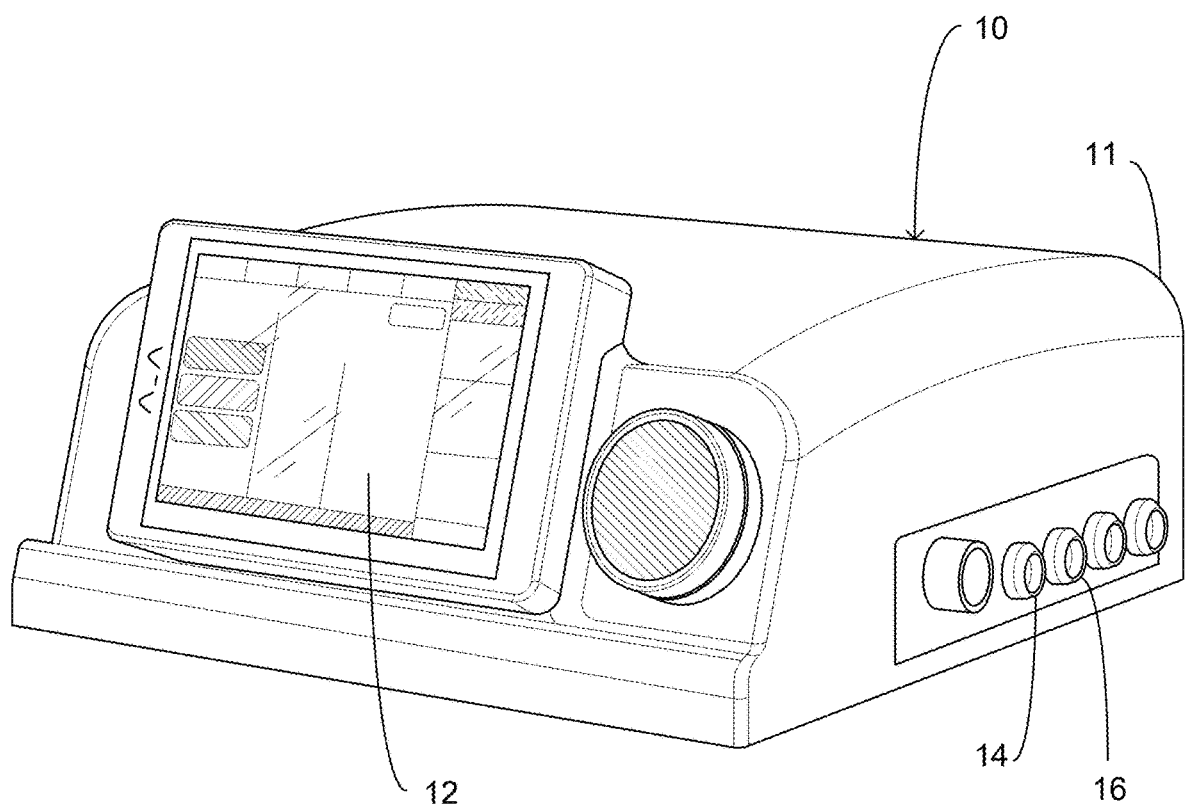
FIG. 4 is a perspective view of an exemplary controller of the present invention.

The thermomagnetic inhaler includes two sources of compressed gas, the first of which is a source of compressed helium, the second is a source of compressed oxygen. The compressed helium source is connected, via a sealed tube, to a filter 1, which is connected in series, via a tube to a safety valve 2, which is connected in series, via a tube to an adjustable valve 3, which is connected in series, via a tube to a flow sensor 4, which is connected in series, via a tube to a mixer 5. The source of compressed oxygen is also connected, via a sealed tube, to filter 1, which is connected in series, via a tube to safety valve 2, which is connected in series, via a tube to adjustable valve 3, which is connected in series, via a tube to flow sensor 4, which is connected in series, via a tube to mixer 5. Mixer 5 is a chamber with a turbulator and has two inputs from flow sensors 4 and one output. The output of mixer 5 is connected to oxygen sensor 6, which is connected in series to pressure sensor 7, which is connected in series to heater 8, which is connected in series to magnetic element 9, which is connected in series to check valve 10, which is connected in series to face mask 11. The magnetic element 9 is a hollow magnetic circuit with permanent magnets located on it. The magnetic element 9 is designed with the possibility of polarizing oxygen molecules. The embodiments of the magnetic element 9 are shown in FIG. 3. In particular, FIG. 3-1 shows an embodiment with an axial direction of the magnetic field strength vector, when the permanent magnets are directed with different poles to the internal volume of the magnetic circuit. FIG. 3-2 shows an embodiment with a transverse direction of the magnetic field strength vector, when the permanent magnets are directed with the same poles to the internal volume of the magnetic circuit. FIG. 3-3 shows an embodiment with a change in the direction of the magnetic field strength vector according to a harmonic law, when several permanent magnets are located in the magnetic circuit. The heater 8 is a device consisting of heating elements, which are thin ceramic plates with a resistive layer made in the form of a spray; a fairing made with the possibility of distributing the gas mixture flow along the perimeter of the inner part of the heater 8 and two temperature sensors 13, one of which is located at the outlet of the heater, the second directly on the heating element. In this case, the temperature sensor 13, installed on the heating element, is made with the possibility of limiting the temperature of the heating element.

The adjustable valves 3, the flow sensors 4, the oxygen sensor 6, the pressure sensor 7 and the heater 8 are connected to the control device 12. The control device 12 can be a software and hardware complex configured to receive information from the flow sensors 4, the oxygen sensor 6, the pressure sensor 7 and the temperature sensors 13 from the heater 8. The control device 12 is also configured to send control commands to the adjustable valves 3 and the heater 8. Sending control commands ensures maintaining the required temperature on the heater 8, the required pressure and oxygen concentration. It is possible to implement the device with a closed helium circulation circuit to reduce costs. The thermomagnetic inhaler 100 is designed with the ability to provide inhalation with thermal heliox, and further have the ability to change the oxygen content from 21% to 50% and temperature from 40° C. to 100° C. The thermomagnetic inhaler 100 provides the supply of pharmaceuticals through a built-in nebulizer and is further configured to monitor single and minute respiratory volume, respiratory rate, saturation and other parameters.

A method of using a thermomagnetic inhaler characterized in that initially oxygen and helium are supplied from sources of compressed gas, which pass through the sealed tubes, undergo primary filtration, then pass through filters 1 and on to the safety valve 2, further helium and oxygen, passing through flow meter 4, enter the mixer 5, where the two gases are mixed. The mixed gas is then fed through oxygen sensor 6 and pressure sensor 7 to heater 8, where it is heated to the required temperature. The mixed gas then goes to magnetic element 9, where oxygen molecules are polarized. The mixed gas then passes through the check valve 10 and enters the face mask 11 outlet and then enters the patient's respiratory tract. The check valve 10 opens on exit and closes on inhalation, preventing air from entering the system. During the operation of the flow sensor 4, oxygen sensor 6, pressure sensor 7 and temperature sensors 13, information is sent to the control device 12 in real time. Based on the information received, the control device 12 also in real time, provides control commands to heater 8 and adjustable valves 3, maintaining the required pressure, oxygen concentration and temperature. The technical result of the invention is an increase in oxygen consumption by tissues, due to the fact that the adjustable valve 3, flow sensors 4, oxygen sensor 6, pressure sensor 7 and heater 8 are connected to the control device 12, which allows for thermal helium inhalation, with the ability to change oxygen content from 21% to 50% and temperature from 40° C. to 100° C., thus ensuring the maximum range of preset parameters for increasing patient oxygen consumption. The technical result is also achieved due to the presence of a magnetic element 9, which represents a magnetic wire with permanent magnets located thereon.

Passing through magnetic element 9 realizes the polarization of oxygen molecules. Since oxygen molecules are paramagnetic, when passing through the magnetic element 9 oxygen molecules are magnetized in the external magnetic field in the direction of the external magnetic field, acquiring positive magnetic susceptibility. In this case, the magnetic moments of oxygen molecules under the action of external fields are oriented along the field and thus create a resulting field that is larger than the external one.

After orientation in the magnetic field (polarization), oxygen molecules, together with helium, enter the patient's airway through the check valve 10 and face mask 11. The effect of a magnetic field on a mixture of gases increases oxygen consumption by tissues, which is confirmed by previous clinical studies. Furthermore, thermomagnetic inhaler 100 due to the presence of magnetic element 9, increases the safety of treatment procedure for patients with respiratory disorder syndrome, hypoxemia and hypercapnia because permanent magnets can be used as filters and reliably protect the respiratory organs of the patient from fine metal particles. The consumption of tissues oxygen, the magnetic element 9 passed through a magnetic conductor is ten percent higher than the version of the device without the magnetic element 9.

A description of the thermomagnetic inhaler 100 in use is as follows.

The thermomagnetic inhaler 100 was utilized to treat patients with respiratory disorder syndrome, hypoxemia and hypercapnia for a sample of twenty people. Treatment was organized in several stages, in compliance with the method of the present invention. Step 701, selection the optimal t-He/O2 oxygen ratio to start the procedure (from 21% to 40%). In step 703 the operator selected the optimal temperature to start the procedure (from 45° C. to 100° C.). Step 705, the operator placed the patient in a lying or sitting position, fixing the back. In step 707, the operator of the method of the present invention put on the patient face mask. Step 709 performing of inhalation in cyclic-fractional mode by supplying thermal helium. In step 711, initial supply thermal heliox with the optimal temperature regime and with a minimum oxygen ratio of 21% for two minutes. Step 713, sequential increase of the oxygen ratio by several percentage points to the optimal level. In step 715, with each increase in the oxygen ratio by several percentage points, inhalation is performed for two minutes. Step 717, interruption of the inhalation procedure for 10 minutes via removal of the mask from the patient's face. In step 719, the supply thermal heliox with the optimal temperature regime and optimal oxygen ratio is administered for two minutes. In step 719, the operator sequentially decreased the oxygen ratio by several percentage points to the minimum level of twenty-one percent. Step 721, with each decrease in the oxygen ratio by several percentage points, inhalation is performed for two minutes.

The course of treatment was implemented for the device without magnetic element 9 and with magnetic element 9, oxygen consumption was measured by a gas analyzer after the implementation of the above-described method. Monitoring the condition of twenty people showed that tissue oxygen consumption of patients who used the device with magnetic element 9 was increased by an average of ten percent in relation to patients who used a conventional device. Additionally, the use of the thermomagnetic inhaler 100 and method thereof as described herein made possible reduction of the duration of the disease by an average of twenty-five percent. Furthermore, the use of different designs of the magnetic element 9 gives different results for different groups of patients. Conventionally, all patients can be divided into three groups. In the first group, the maximum positive effect is achieved with the axial direction of the magnetic field intensity vector. In the second group, the maximum positive effect is achieved with the transverse direction of the magnetic field intensity vector. In the third group, the maximum positive effect is achieved with a change in the direction of the magnetic field intensity vector according to the harmonic law. The greatest effect was achieved in the treatment of coronavirus at the last stage of the disease.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A thermomagnetic inhaler includes two compressed gas sources, the first of which is a source of compressed helium, the second of oxygen, each of the compressed gas sources is sequentially connected by means of sealed tubes to filters, safety valves and adjustable valves, the adjustable valves are connected to a mixer, which is sequentially connected by means of sealed tubes to a heater, a magnetic element, a check valve and a face mask, wherein the magnetic element consists of a hollow magnetic circuit and permanent magnets, flow sensors are connected to sealed tubes between the adjustable valves and the mixer, oxygen and pressure sensors are connected to a sealed tube between the mixer and the heater, and adjustable valves, flow sensors, oxygen sensor, pressure sensor and heater are connected to a control device.

2. The thermomagnetic inhaler according to claim 1, characterized in that the permanent magnets face different poles to the internal volume of the hollow magnetic circuit.

3. The thermomagnetic inhaler according to claim 1, characterized in that the permanent magnets face the same poles to the internal volume of the hollow magnetic circuit.

4. The thermomagnetic inhaler according to claim 1, characterized in that several permanent magnets are located in a hollow magnetic circuit.

5. A method of using a thermomagnetic inhaler, characterized in that oxygen and helium are initially supplied from compressed gas sources, then the oxygen and helium are filtered and mixed in mixers, then the resulting gas mixture is heated and fed into the hollow magnetic circuit of a magnetic element, permanent magnets in the magnetic element polarize the oxygen molecules, then the gas mixture is fed into a patient's respiratory tract through a check valve and a face mask.

6. The method of using the thermomagnetic inhaler as recited in claim 5, wherein the gas mixture has a temperature of up to 212 degrees Fahrenheit (100° C.) exiting the outlet opening of said heater cell.

7. A thermomagnetic inhaler comprising:
a first gas source and a second gas source, said first gas source being compressed helium, said second gas source being compressed oxygen, wherein said first gas source and said second gas source being sequentially connected with sealed tubes, said sealed tubes having filters, said sealed tubes further including safety valves, said sealed tubes further having operably coupled thereto adjustable valves, said adjustable valves being operably coupled to a mixer, said mixer being sequentially connected utilizing sealed tubes to a heater, said heater having a magnetic element, then to a check valve and a face mask, wherein the magnetic element consists of a hollow magnetic circuit and permanent magnets, wherein the thermomagnetic inhaler further includes flow sensors connected to the sealed tubes between the adjustable valves and the mixer, and wherein the thermomagnetic inhaler further includes oxygen and pressure sensors being connected with a sealed tube between the mixer and the heater, wherein said adjustable valves, said flow sensors, said oxygen sensor, said pressure sensor and said heater are connected to a control device.

8. The thermomagnetic inhaler according to claim 7, characterized in that the permanent magnets face different poles to the internal volume of the hollow magnetic circuit.

9. The thermomagnetic inhaler according to claim 7, characterized in that the permanent magnets face the same poles to the internal volume of the hollow magnetic circuit.

10. The thermomagnetic inhaler according to claim 7, characterized in that several permanent magnets are located in the hollow magnetic circuit.

11. A method of using a thermomagnetic inhaler wherein the method comprises the steps of:
supplying oxygen and helium from compressed gas sources, wherein the oxygen and helium compressed gas sources are operably coupled to the thermomagnetic inhaler;
filtering the oxygen and helium;
mixing the oxygen and helium in mixers to produce a gas mixture;
heating the gas mixture;
directing the gas mixture into a hollow magnetic circuit of a magnetic element of the thermomagnetic inhaler,
polarizing the oxygen molecules, wherein the magnetic element polarizes the oxygen molecules,
directing the gas mixture to a patient's respiratory tract through a check valve and a face mask.

\* \* \* \* \*